United States Patent
Bandyopadhyay et al.

(10) Patent No.: US 9,112,887 B2
(45) Date of Patent: Aug. 18, 2015

(54) MIRRORING SOLUTION IN CLOUD STORAGE ENVIRONMENT

(75) Inventors: Somenath Bandyopadhyay, Santa Clara, CA (US); Abhijeet P. Gole, Cupertino, CA (US)

(73) Assignee: Toshiba Corporation, Tokyo (JP)

( * ) Notice: Subject to any disclaimer, the term of this patent is extended or adjusted under 35 U.S.C. 154(b) by 326 days.

(21) Appl. No.: 13/296,801

(22) Filed: Nov. 15, 2011

(65) Prior Publication Data

US 2012/0131126 A1    May 24, 2012

Related U.S. Application Data

(60) Provisional application No. 61/415,775, filed on Nov. 19, 2010.

(51) Int. Cl.
*G06F 15/167* (2006.01)
*H04L 29/08* (2006.01)
*G06F 11/20* (2006.01)

(52) U.S. Cl.
CPC ........ *H04L 67/1097* (2013.01); *G06F 11/2035* (2013.01); *G06F 11/2097* (2013.01); *G06F 11/2046* (2013.01); *H04L 67/1034* (2013.01)

(58) Field of Classification Search
USPC .......................... 709/213, 214, 215, 216, 217
See application file for complete search history.

(56) References Cited

U.S. PATENT DOCUMENTS

| 2006/0112151 | A1* | 5/2006 | Manley et al. | 707/201 |
| 2008/0091747 | A1* | 4/2008 | Prahlad et al. | 707/204 |
| 2012/0072397 | A1* | 3/2012 | Esaka | 707/652 |

OTHER PUBLICATIONS

"SoXC/Nemo Architecture for Xen Server with NFS." Enterprise Storage Software : Architecture and Requirements 1 (Aug. 5, 2011): pp. 1-6.
"High Availability Whitepaper." N.p., May 2011. http://www.ivanildogalvao.com.br/wp-content/uploads/2011/05/HA_deep_2.pdf: pp. 1-6.
"Peeking under the Hood of High Availability." Citrix Blogs. N.p., Sep. 2008. Web. http://blogs.citrix.com/: 1 page.
Chinese Office Action issued in corresponding Chinese Application No. 201110379261.5 on Jan. 4, 2015, along with English translation thereof.

* cited by examiner

Primary Examiner — Lan-Dai T Truong
(74) Attorney, Agent, or Firm — White & Case LLP

(57) ABSTRACT

A system configured to provide access to shared storage includes a first network node configured to provide access to the shared storage to a first plurality of client stations. The first network node includes a first cache memory module configured to store first data corresponding to the first plurality of client stations, and a first cache control module configured to transfer the first data from the first cache memory module to the shared storage. A second network node is configured to provide access to the shared storage to a second plurality of client stations. The second network node includes a second cache memory module configured to store second data corresponding to the second plurality of client stations and store the first data, and a second cache control module configured to transfer the second data from the second cache memory module to the shared storage.

20 Claims, 3 Drawing Sheets

MIRRORING SOLUTION IN CLOUD STORAGE ENVIRONMENT

CROSS-REFERENCE TO RELATED APPLICATIONS

This application claims the benefit of U.S. Provisional Application No. 61/415,775, filed on Nov. 19, 2010. The disclosure of the above application is incorporated herein by reference in its entirety.

FIELD

The present disclosure relates to cache mirroring nodes in a cloud storage environment.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a cloud storage environment, a server provides shared storage for operating one or more virtual machines (VMs). Remote users access the server to use an operating system implemented by respective ones of the VMs. For example only, the users access the server via corresponding client stations or computers. The client stations communicate with a cluster of network nodes, which in turn interface with the server. For example, each client station may communicate with one of the nodes, which communicates with the server on behalf of one or more of the client stations. The node caches data used by the client stations. Accordingly, the data is available to the client stations without having to directly access the server.

SUMMARY

A system configured to provide access to shared storage includes a first network node configured to provide access to the shared storage to a first plurality of client stations. The first network node includes a first cache memory module configured to store first data corresponding to the first plurality of client stations, and a first cache control module configured to transfer the first data from the first cache memory module to the shared storage. A second network node is configured to provide access to the shared storage to a second plurality of client stations. The second network node includes a second cache memory module configured to store second data corresponding to the second plurality of client stations and store the first data, and a second cache control module configured to transfer the second data from the second cache memory module to the shared storage, and, in response to a failure of the first network node, transfer the first data from the second cache memory module to the shared storage.

In other features, the cluster management module is configured to detect the failure of the first network node and instruct the second network node to transfer the first data to the shared storage. The first network node is configured to transfer the first data to the second network node when at least one of the first data is written to the first network node and the first data is modified in the first network node. The first network node is configured to instruct the second network node to invalidate the first data stored in the second cache memory module in response to the first network node transferring the first data to the shared storage.

In other features, a system configured to provide access to shared storage includes a plurality of network nodes arranged in a node cluster, each of the plurality of network nodes configured to provide access to the shared storage to a plurality of client stations. A cluster management module is configured to assign each of the network nodes to a node pair. Each of the node pairs includes a primary network node and a mirror network node. The primary network node is configured to store first data associated with a first group of the plurality of client stations. The mirror network node is configured to store the first data and to store second data associated with a second group of the plurality of client stations. The mirror network node is configured to transfer the first data to the shared storage in response to a failure of the primary network node.

In other features, the cluster management module is configured to detect whether one of the plurality of network nodes fails and reassign the plurality of network nodes to node pairs.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Network nodes in a cloud storage environment are arranged in clusters. Each cluster interfaces with a cluster management module. The cluster management module manages and configures the nodes. For example only, the cluster management module manages communication between the nodes, a plurality of client stations, and a server based on availability and load balancing.

One or more of the client stations communicate with the server via a selected one of the nodes. Accordingly, the selected node stores data used by the client stations to minimize communication between the client stations and the server. If the node fails, then the client stations are assigned to a different node, and communicate with the server via the different node. If the node fails before any modified data stored in the node is flushed (i.e., transferred) to the server, then the modified data is lost to the client stations.

In a cloud storage environment according to the principles of the present disclosure, each node is paired with another node and flushes data to the other node under certain conditions (e.g., when a write operation is performed in the node). If a node fails, then any client stations associated with that node are assigned to the other node. Accordingly, data loss caused by the failure of the node is minimized.

Figure 1:
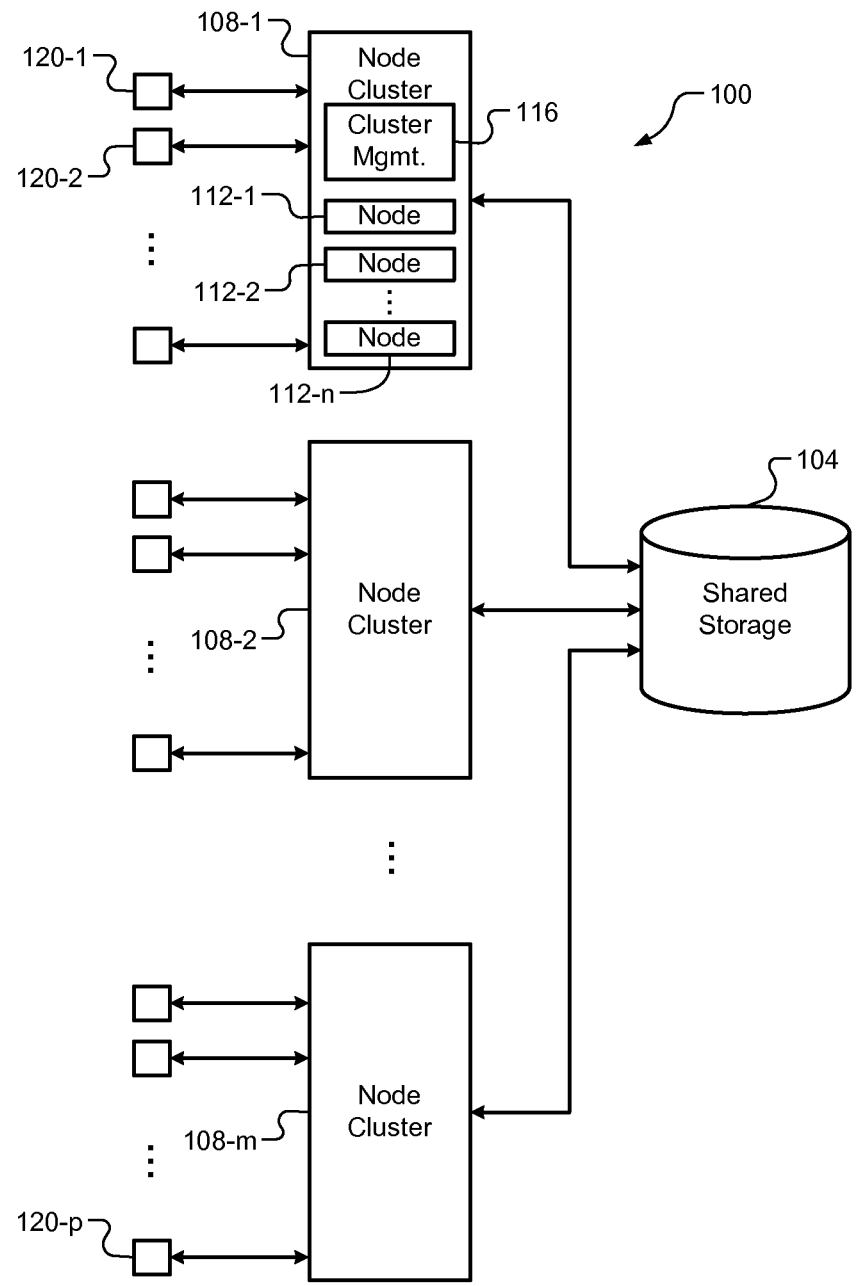
FIG. 1 is a functional block diagram of a cloud storage environment according to the present disclosure.

Referring now to FIG. 1, a system 100 operating in a cloud storage environment includes shared storage 104 (e.g., shared storage, such as a filer, provided by a network server). A plurality of node clusters 108-1, 108-2, . . . , 108-*m* (referred to collectively as node clusters 108) communicate with the shared storage 104. The node clusters 108 may be locally or remotely located with respect to the shared storage 104.

The node clusters 108 each include a plurality of network nodes 112-1, 112-2, . . . , 112-*n* (referred to collectively as network nodes 112) and a cluster management module 116. Although the node cluster 108-1 is shown having n nodes, it is to be understood that the other node clusters 108-2, . . . , 108-*m* may include n or another number of nodes. For example only, each of the node clusters 108 may include 16 of the nodes 112. In other words, the node cluster 108-1 may include 16 nodes 112-1 . . . 112-16. Similarly, the node cluster 108-2 may include another 16 nodes 112-1 . . . 112-16 that are different from the nodes of the node cluster 108-1. Further, although shown separate from the nodes 112, the cluster management module 116 may also be integrated with one or more of the nodes 112. A plurality of client stations 120-1, 120-2, . . . , 120-*p* (referred to collectively as client stations 120) interface with the shared storage 104 via the nodes 112. For example, each of the client stations 120 may execute a host application that interfaces with a virtual machine (VM) implemented on the nodes 112 and the shared storage 104.

Each of the nodes 112 within one of the node clusters 108 caches data used by associated ones of the client stations 120 for interfacing with corresponding VMs. Further, each of the nodes 112 is paired with another of the nodes 112. For example, in a first node pair, the node 112-1 may be a primary node and the node 112-2 may be a paired node (i.e., a mirror node) for the primary node. Conversely, in a second node pair, the node 112-2 may be the primary node and the node 112-*n* may be the mirror node. In an nth node pair, the node 112-*n* may be the primary node and the node 112-1 may be the mirror node.

Accordingly, each of the nodes 112 in a node cluster 108 is a primary node in one node pair (e.g. the node 112-1 in a first node pair) and a mirror node in another node pair (e.g., the node 112-1 in an nth node pair). In each node pair, the primary node caches the data of associated client stations 120 and also provides the data of its associated client stations 120 to the mirror node. For example, the node 112-1 caches the data of the client stations 120 and provides the data to the node 112-2.

In each of the node clusters 108, the corresponding cluster management module 116 manages assignment and reassignment of the client stations 120 to the nodes 112, and assigns the nodes 112 to respective node pairs. For example only, the cluster management module 116 may store information identifying associations between the client stations 120 and the nodes and information identifying primary nodes and mirror nodes of each node pair. The nodes 112 may be assigned to pairs based on criteria including, but not limited to, fault zones and/or power supply use. For example, the cluster management module 116 may assign the nodes 112 into pairs such that the nodes 112 in each pair do not use the same power supply and/or are not located in the same fault zone. Further, although the nodes 112 are described as being assigned to node pairs, it is to be understood that in other embodiments some of the nodes 112 may be paired with more than one other node.

The cluster management module 116 determines whether one of the nodes 112 fails. For example only, the cluster management module 116 may determine that a node 112 fails if the node 112 does not respond to certain data packets transmitted by the cluster management module 116, if another one of the nodes 112 informs the cluster management module 116 that attempts to access the node 112 are unsuccessful, and/or one or more other error conditions. If a primary one of the nodes 112 fails, the cluster management module 116 instructs the corresponding mirror node to flush the data of the corresponding primary node to the shared storage 104. The mirror node flushes the data to the shared storage 104, and notifies the cluster management module 116 when the flushing is complete. Accordingly, the data of the primary node remains available to the client stations 120 despite failure of the primary node. The cluster management module 116 reassigns the VMs corresponding to the failed primary node to one or more other nodes 112, and may reassign node pairs. For example, the failed primary node may have also been the mirror node for another one of the nodes 112. Accordingly, the cluster management module 116 also instructs the other one of the nodes 112 to flush its data to the shared storage 104 and may be reassign the other one of the nodes 112 a different mirror node. The other one of the nodes 112 also may transition to a writethrough mode until it is paired with a different mirror node. For example, in the writethrough mode, all write operations in the node 112 are replicated in the shared storage 104.

The cluster management module 116 may also instruct the mirror node to flush the data of the corresponding primary node to the shared storage 104 if client stations 120 associated with the primary node are assigned to a different one of the nodes 112. Accordingly, the data flushed to the shared storage 104 remains available to the client stations 120 if the client stations 120 access the shared storage 104 through the different one of the nodes 112.

Figure 2:
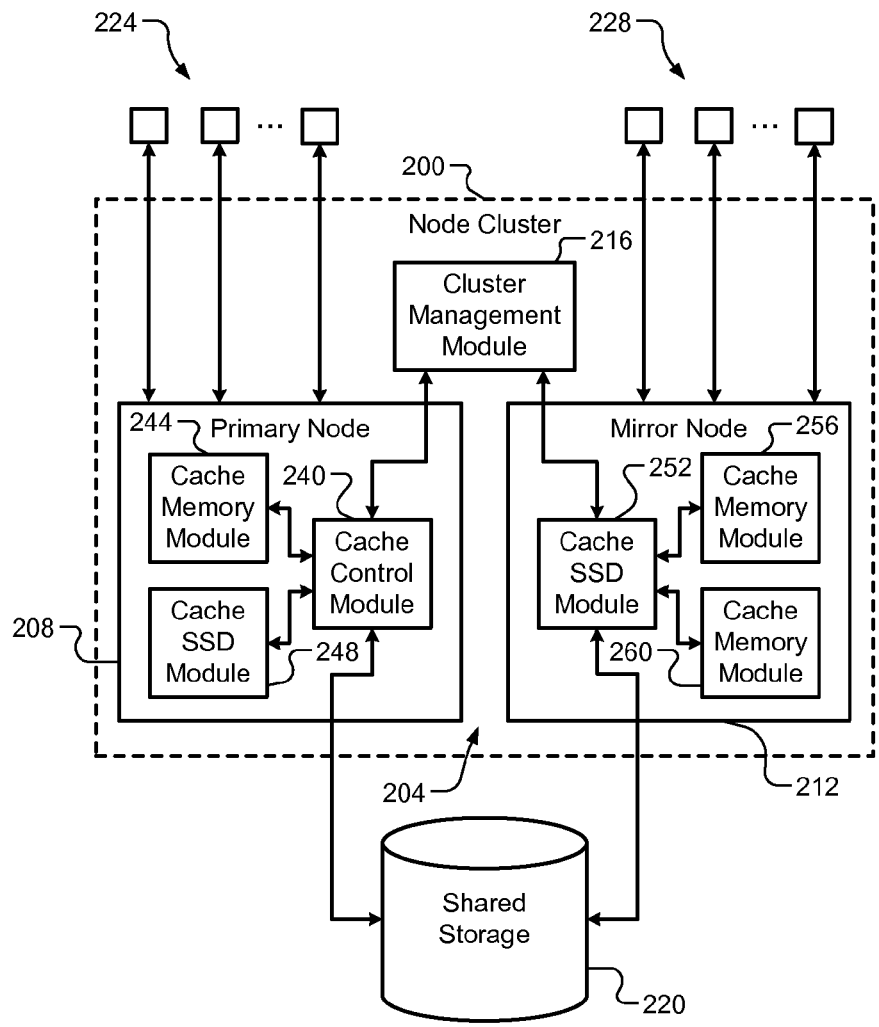
FIG. 2 is a functional block diagram of a node pair according to the present disclosure.

Referring now to FIG. 2, a node cluster 200 includes a node pair 204 having a primary node 208 and a mirror node 212. Although it is to be understood that the node cluster 200 includes a plurality of additional nodes (e.g., for a total of 16 nodes), only the node pair 204 is shown for illustrative purposes. For example, the primary node 208 may be a mirror node in a different node pair. The node pair 204 communicates with a cluster management module 216, shared storage 220, and respective client stations 224 and 228.

The primary node 208 includes a cache control module 240, a cache memory module 244 (e.g., an L1 cache), and a cache solid state drive (SSD) module 248 (e.g., an L2 cache). For example only, the cache memory module 244 may be L1 (i.e., level 1) memory that is relatively faster with less storage space than the cache SSD module 248 (e.g., L2, or level 2, memory). Conversely, the mirror node 212 includes a cache control module 252, a cache memory module 256, and a cache SSD module 260. For example only, the cache memory modules 244 and 256 may include nonvolatile memory such as NVRAM. Conversely, the cache memory modules 248 and 260 may include an SSD. Further, although the primary node 208 and the mirror node 212 are shown to include the cache modules 244, 248, 252, and 256, the primary node 208 and the mirror node 212 may include any other suitable cache memory arrangement.

When data is modified in the primary node 208 (e.g., data is written to or modified in the primary node 208 based on interaction with one of the client stations 224), the cache control module 240 of the primary node 208 stores the modified data in one or both of the cache modules 244 and 248 and flushes the modified data to the mirror node 212. The cache control module 240 may also flush data to the shared storage 220 according to any suitable criteria. For example, the cache control module 240 may flush data to the shared storage 220 periodically and/or based on reaching a predetermined amount of modified data.

The cache control module 252 stores the modified data in one or both of the cache modules 256 and 260. If the primary node 208 fails, the cluster management module 216 detects the failure and instructs the cache control module 252 of the mirror node 212 to flush the modified data to the shared storage 220. The cache control module 252 notifies the cluster management module 216 when the flushing of the modified data to the shared storage 220 is complete, and the cluster management module 216 reassigns the client stations 224 (and any correspond VMs) to different nodes. The cluster management module 216 may also reassign node pairs in the node cluster 200.

Conversely, if the mirror node 212 fails, the cluster management module 216 may inform the primary node 208 of the failure of the mirror node 212. In response, the primary node 208 may flush data to the shared storage 220 and no longer attempt to flush data to the mirror node. For example only, the primary node 208 may flush data to the shared storage 220 in a writethrough mode (e.g., all write operations in the primary node 208 are replicated/backed up to the shared storage 220) until the cluster management module assigns a new mirror node to the primary node 208.

In an implementation, the cache control module 240 of the primary node 208 may flush the modified data to the mirror node 212 in response to data being written to (i.e., data being modified in) one or both of the cache memory module 244 and 248. For example only, the cache control module 252 stores a backup image (i.e., a copy) of data stored in the cache modules 244 and 248 to the cache memory module 256. Initially, the backup image data is stored to the cache memory module 256, and the cache control module 252 may transfer the backup image data from the cache memory module 256 to the cache SSD module 260 at a later time. Backup image data that is stored to the cache modules 256 and 260 may be referred to as "paused" data.

The mirror node 212 maintains the paused data, which was flushed to the mirror node 212, for every write operation that takes place in the primary node 208 (e.g., in the cache modules 256 and 260). When any data in the primary node 208 that corresponds to paused data in the mirror node 212 is modified (e.g., overwritten), the affected data is also flushed to the mirror node 212 so that the data in the mirror node 212 reflects the modified data in the primary node 208. Conversely, when data in the primary node 208 that corresponds to paused data in the mirror node 212 is flushed to the shared storage 220, the paused data in the mirror node 212 becomes "invalid" or "free paused." For example, if the primary node 208 flushes data to the shared storage 220, the primary node 208 may instruct the mirror node 212 to invalidate any corresponding paused data. However, the mirror node 212 may subsequently reuse data that is marked "free paused" if the VM corresponding to the free paused data interfaces with the mirror node 212 after a failure of the primary node 208. The mirror node 212 may not use the invalidated data and may subsequently write over the invalidated data if the mirror node 212 marks the data as invalid, or may reuse the data under certain conditions if the data is "free paused."

Further, the mirror node 212 flushes any paused data that has not been invalidated to the shared storage 220 when the cluster management module 216 determines that the primary node 208 has failed. For example, the cluster management module 216 may instruct the mirror node 212 to flush the paused data.

Figure 3:
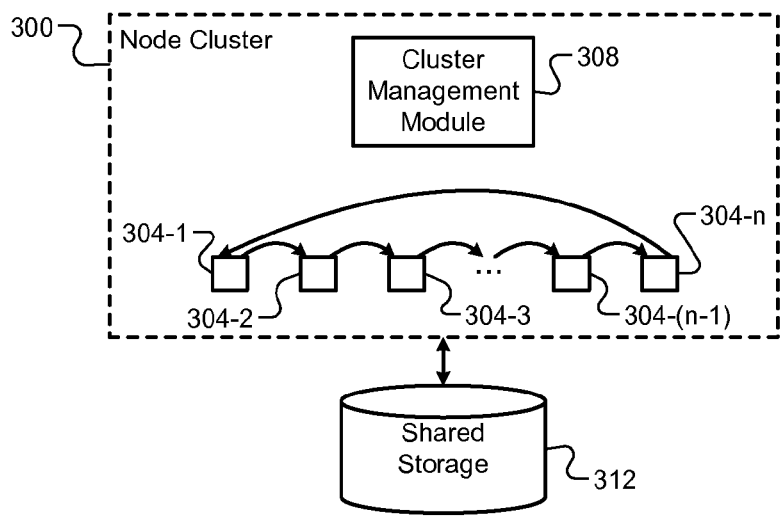
FIG. 3 is a functional block diagram of a node cluster according to the present disclosure.

Referring now to FIG. 3, a node pair configuration in a node cluster 300 includes nodes 304-1, 304-2, 304-3, . . . , 304-(n−1), and 304-n, referred to collectively as nodes 304, that are managed by a cluster management module 308. The nodes 304 communicate with shared storage 312. The cluster management module 308 assigns the nodes 304 into node pairs. For example, in a first node pair, the node 304-1 is the primary node and the node 304-2 is the mirror node. Similarly, in a second node pair, the node 304-2 is the primary node and the node 304-3 is the mirror node. In an (n−1)th node pair, the node 304-(n−1) is the primary node and the node 304-n is the mirror node. Conversely, in an nth node pair, the node 304-n is the primary node and the node 304-1 is the mirror node. Accordingly, each of the nodes 304 is in two node pairs, and each of the nodes 304 is the primary node in one node pair and the mirror node in another node pair. Further, if any of the nodes 304 fails, two node pairs are affected.

Each of the nodes 304 may be associated with a unique identifier. When the cluster management module 308 assigns two of the nodes 304 to a node pair, each of the nodes 304 in the node pair receives information indicative of the unique identifier of the other node 304. For example, the cluster management module 308 may provide the identifier of the node 304-1 to the node 304-2 to identify the node 304-1 as the primary node. Conversely, the cluster management module 308 may provide the identifier of the node 304-2 to the node 304-1 to identify the node 304-2 as the mirror node. Based on the identifier of the primary node, the mirror node provides access to the primary node and reserves a predetermined amount of memory to store data flushed from the primary node.

When one of the nodes 304 fails, the cluster management module 308 removes the node 304 from the corresponding node pairs and from the node cluster 300. For example, if the node 304-1 fails, the cluster management module 308 instructs the node 304-2 to disallow any subsequent data from the node 304-1 and to flush any paused data corresponding to the node 304-1 to the shared storage 312. The cluster management module 308 may also instruct the node 304-n to no longer flush data to the node 304-1.

After the data of any affected nodes is flushed, the cluster management module 308 may reassign the nodes 304 into node pairs without the node 304-1. For example, in a first node pair, the node 304-2 may be the primary node and the node 304-3 may be the mirror node. In an (n−2)th node pair, the node 304-(n−1) may be the primary node and the node 304-n may be the mirror node. In an (n−1)th node pair, the node 304-n may be the primary node and the node 304-2 is the mirror node. Accordingly, the failed node 304-1 is no longer assigned to any node pairs in the node cluster 300. The cluster management module 308 may reboot the node 304-1 or take other remedial measures to repair the node 304-1. If successful, the node 304-1 can reenter the node cluster 300 and be reassigned to the node pairs.

Figure 4:
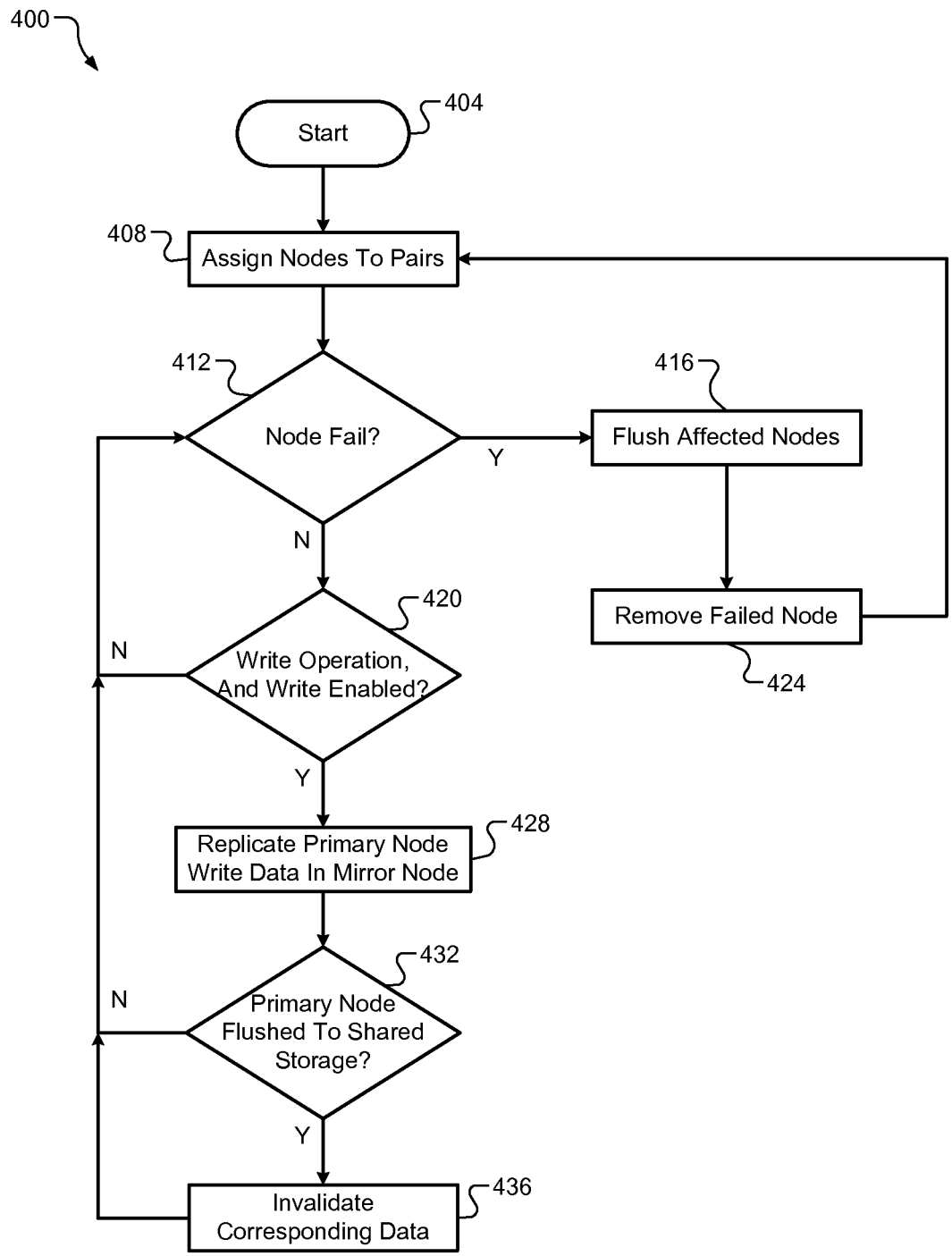
FIG. 4 illustrates steps of a node pairing method according to the present disclosure.

Referring now to FIG. 4, a node pairing method 400 begins at 404. At 408, the method 400 assigns nodes in a node cluster to a node pair having a primary node and a mirror node. At 412, the method 400 determines whether any node in the node cluster has failed. If true, the method 400 continues to 416. If false, the method 400 continues to 420. At 416, the method 400 flushes any node affected by the node failure to shared storage. For example, the method 400 flushes the mirror node of the failed node, and may also flush a corresponding primary node of the failed node in a different node pair. At 424, the method 400 removes the failed node from any node pairs in the node cluster. The method 400 continues to 408 to reassign the nodes in the node cluster to node pairs without the failed node.

At 420, the method 400 determines whether there is a write operation in a primary node and writeback (i.e., replicating the write to a corresponding mirror node) is enabled. If true, the method 400 continues to 428. If false, the method 400 continues to 412. At 428, the method 400 replicates modified or written data in a primary node to a corresponding mirror node. At 432, the method 400 determines whether the primary node flushed data to the shared storage. If true, the method 400 continues to 436. If false, the method 400 continues to 412. At 436, the method 400 invalidates data in the mirror node that corresponds to the data flushed by the primary node.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system configured to provide access to shared storage, the system comprising:
    a first network node configured to provide access to the shared storage to a first plurality of client stations, the first network node including:
    a first cache memory module configured to store first data, wherein the first data is associated with implementing virtual machines of the first plurality of client stations; and
    a first cache control module configured to transfer the first data from the first cache memory module to the shared storage; and
    a second network node configured to provide access to the shared storage to a second plurality of client stations, the second network node including:
    a second cache memory module configured to (i) store second data, wherein the second data is associated with implementing virtual machines of the second plurality of client stations, and (ii) also store the first data associated with implementing the virtual machines of the first plurality of client stations; and
    a second cache control module configured to (i) transfer the second data from the second cache memory module to the shared storage, and, (ii) in response to a failure of the first network node, transfer the first data from the second cache memory module of the second network node to the shared storage for retrieval by the first network node.

2. The system of claim 1, further comprising a cluster management module configured to assign the second network node and the first network node to a node pair.

3. The system of claim 2, wherein the cluster management module is configured to detect the failure of the first network node and instruct the second network node to transfer the first data to the shared storage.

4. The system of claim 2, wherein the cluster management module is configured to remove the first network node from the node pair.

5. The system of claim 1, wherein the first network node is configured to transfer the first data to the second network node when at least one of the first data is written to the first network node and the first data is modified in the first network node.

6. The system of claim 1, wherein the first network node is configured to instruct the second network node to invalidate the first data stored in the second cache memory module in response to the first network node transferring the first data to the shared storage.

7. The system of claim 1, wherein the first plurality of client stations is configured to operate according to the first data transferred from the second cache memory module to the shared storage.

8. The system of claim 1, wherein the first cache memory module and the second cache memory module include at least one of NVRAM and a solid state drive (SSD).

9. The system of claim 1, wherein the first data and the second data correspond to virtual machine data.

10. A system configured to provide access to shared storage, the system comprising:
    a plurality of network nodes arranged in a node cluster, each of the plurality of network nodes configured to provide access to the shared storage to a plurality of client stations; and
    a cluster management module configured to assign each of the network nodes to a node pair, wherein each of the node pairs includes a primary network node and a mirror network node, the primary network node is configured to store first data associated with implementing virtual machines of a first group of the plurality of client stations, the mirror network node is configured to store the first data and to store second data associated with implementing virtual machines of a second group of the plurality of client stations, and the mirror network node is configured to transfer the first data to the shared storage in response to a failure of the primary network node.

11. The system of claim 10, wherein each of the plurality of network nodes is a primary network node in a first node pair and a mirror network node in a second node pair.

12. The system of claim 10, wherein the cluster management module is configured to detect whether one of the plurality of network nodes fails and reassign the plurality of network nodes to node pairs.

13. A method of providing access to shared storage, the method comprising: using a first network node,
- providing access to the shared storage to a first plurality of client stations;
- storing first data, wherein the first data is associated with implementing virtual machines of the first plurality of client stations; and
- transferring the first data from the first network node to the shared storage; and using a second network node,
- providing access to the shared storage to a second plurality of client stations; storing second data, wherein the second data is associated with implementing virtual machines of the second plurality of client stations;
- storing the first data associated with implementing the virtual machines of the first plurality of client stations;
- transferring the second data from the second network node to the shared storage; and
- in response to a failure of the first network node, transferring the first data from the second network node to the shared storage.

14. The method of claim 13, further comprising assigning the second network node and the first network node to a node pair.

15. The method of claim 14, further comprising:
- detecting the failure of the first network node; and instructing the second network node to transfer the first data to the shared storage.

16. The method of claim 14, further comprising removing the first network node from the node pair.

17. The method of claim 13, further comprising transferring the first data to the second network node when at least one of the first data is written to the first network node and the first data is modified in the first network node.

18. The method of claim 13, further comprising instructing the second network node to invalidate the first data stored in the second network node in response to the first network node transferring the first data to the shared storage.

19. The method of claim 13, wherein the first plurality of client stations is configured to operate according to the first data transferred from the second network node to the shared storage.

20. The method of claim 13, wherein the first data and the second data correspond to virtual machine data.

\* \* \* \* \*